INVENTOR
ERIC VAN DER VOORT

United States Patent Office 3,616,645
Patented Nov. 2, 1971

3,616,645
CONVERSION OF HEAT INTO KINETIC ENERGY
Eric van der Voort, Ispra, Italy, assignor to European Atomic Energy Community-Euratom, Brussels, Belgium
Filed Aug. 5, 1968, Ser. No. 750,152
Int. Cl. F01k 27/00
U.S. Cl. 60—1  4 Claims

ABSTRACT OF THE DISCLOSURE

Converter of heat into kinetic energy using a fluid or suspension having ferromagnetic characteristics, a secondary fluid, a first heat exchanger in which heat is transferred by a secondary fluid to the ferromagnetic fluid; the secondary fluid being caused to circulate in the opposite direction to the ferromagnetic fluid by means of a pump and extracting in a second heat exchanger thermal energy; and varying the magnetic field in the first heat exchanger in such a manner that the magnetic entropy due to the alignment of the magnetic particles of the fluid by means of the magnetic field remains constant.

---

The object of this invention is to produce a high-yield circuit for the conversion of heat into kinetic energy based on a magnetocaloric effect acting on a fluid having ferromagnetic properties.

Figure 1:
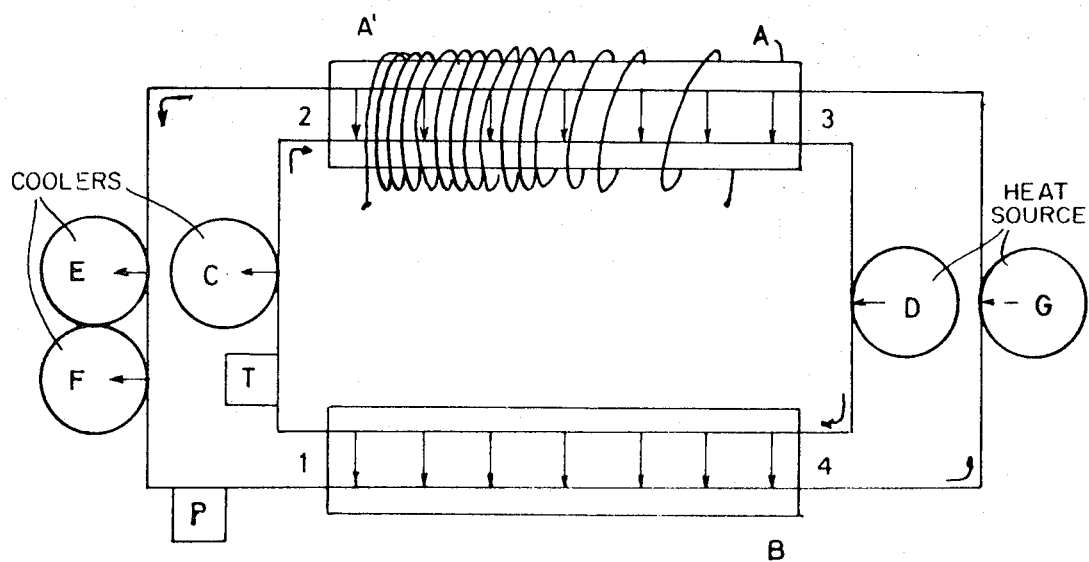
Figure 2:
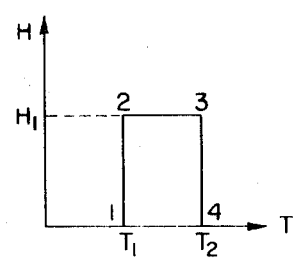
Figure 3:
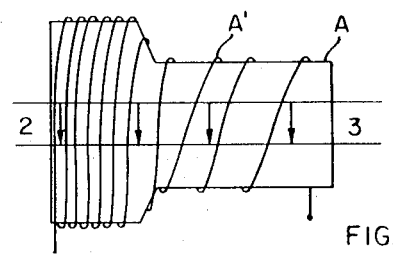
Figure 4:
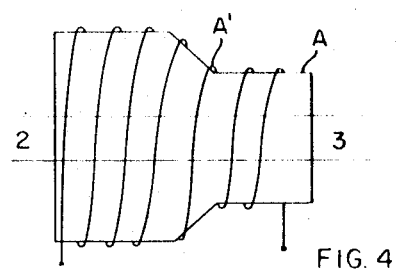

It is already known (AIAA Journal, vol. 2, p. 1418, 1964) to use a circuit using a fluid, for example kerosene, in which very small ferromagnetic particles (100 A.) are suspended (this suspension is here termed "ferrofluid" and indicated by FF) for converting heat into kinetic energy. In this circuit the FF suspension is set in motion by the attraction exerted by a magnitude field. This is generated, for example, by a coil. The FF suspension is caused to pass through the interior of the coil, being first attracted into the coil at a determined temperature and thus set in motion. The temperature of the suspension is increased when the suspension is within the coil, magnetization being reduced until it is practically completely eliminated when the Curie temperature $T_C$ is reached. The ferromagnetic particles in suspension, no longer being subjected to more than a very weak magnetic force, can issue practically freely from the coil. Thermal energy is thus converted into kinetic energy. In the accompanying drawings FIG. 1 shows an example of one of these circuits; FIG. 2 is a magnetic field/temperature diagram of the optimum cycle described by the fluid; FIG. 3 shows a second preferred embodiment of the magnetic field producing coil; and FIG. 4 shows a third preferred embodiment of the magnetic field producing coil.

The FF is caused to circulate through an internal circuit 1, 2, 3, 4, while a secondary fluid, FS, is circulated in the opposite direction by means of a pump P in an external circuit. The solenoid or coil that produces a magnetic field $H_1$ which is constant, is represented by A'. The latter is also associated with a heat exchanger; B represents another heat exchanger. The two fluids FF and FS are subjected to heat exchange in the heat exchangers A. The FF circuit includes a cold source C and a heat source D, which serve respectively to extract heat from the system and to supply it (these two sources are the main sources), and a turbine (or utilizer) T. The FS circuit includes (a) a cold source E, which dissipates the heat due to difference between the specific heats of the FF in the presence and absence of a magnetic field, (b) a cold source F and (c) a heat source G to compensate for the differences between the temperatures of the two fluids in counter-current due to losses in the heat exchangers. The two cold sources E and F coincide physically; they are kept separate in theory to simplify the explanation.

The function of the FS is to recover as far as possible the heat yielded by the FF between 4 and 1 and to return it to the FF between 3 and 2, so that the latter is heated from $T_1$ to $T_2$ between 2 and 3 and cooled from $T_2$ to $T_1$ between 4 and 1.

It is known that because of the alignment of the Weiss domains the specific heat of a ferromagnetic material in a magnetic field is less than it would be in the absence of a magnetic field. The variation of the entropy of a magnetic fluid may therefore be expressed by the following formula:

(1) $$dS = dS_{th} + dS_{mag}$$

in which $S_{th}$ is the entropy due to the thermal agitation and $S_{mag}$ is the magnetic entropy due to the alignment caused by the magnetic field.

It has been proved that (2) $$dS_{th} = \frac{C_0(T)}{T} dT$$

and that (3) $$dS_{mag} = \mu_0 \left[ \int_0^{H\partial^2} \frac{M(H,T)}{\partial T^2} \right] dH\, dT + \mu_0 \frac{\partial M(H,T)}{\partial T} \cdots dH$$

in which $C_0(T)$ is the specific heat, in a zero magnetic field of the FF, $\mu_0$ is the magnetic permeability of a vacuum and $M(H,T)$ is the magnetization of the FF in the presence of the magnetic field H and at the temperature T. The relation $M(H,T)$ connecting the magnetization M to the magnetic field H and the temperature T is known as the equation of state of an FF.

The object of this invention is to produce a circuit whose efficiency is higher than that of an equivalent circuit based on the prior art. One of the bases of the present invention is that the two quantities of heat exchanged in A and B between the two fluids FF and FS are equal, nullifying the heat lost in E.

This means that the object is to produce a cycle whose yield is as close as possible to the Carnot yield. For this purpose one must pass from the temperature $T_1$ to the temperature $T_2$ and vice versa without a change in magnetic entropy $S_{mag}$; that is to say, the magnetic field should be varied with the temperature to obtain a function $H^+(T)$, where $H^+(T)$ is the magnetic field strength as a function of temperature, the magnetic field strength decreasing as the temperature increases, such that (4) $$\frac{dH^+(T)}{dT} = -\frac{\int_0^{H^+(T)} \frac{\partial^2 M(H,\,T)}{\partial T^2}\, dH}{\frac{\partial M(H^+,\,T)}{\partial T}}$$

Passage from 4 to 1 always satisfies (4), the magnetic field being zero.

According to the prior art, passage from 2 to 3 is effected with a constant magnetic field (see FIG. 2), and this has the disadvantage that (4) is not satisfied.

A practical example is given by a ferrofluid containing 10% of iron with $T_1 = 628.5°$ K., $T_2 = T_C = 1043°$ K. and a magnetic field $H = 10^5$ oe., which produces a yield of 12% if we ignore the losses in F and G and the work of the pump P.

By varying the magnetic field along the axis of the heat exchanger A so as to satisfy Equation 4, the amount of heat lost in E becomes zero, and, with identical conditions, a 40% yield will be obtained:

$$\eta = 1 - \frac{T_1}{T_2} = 40\%$$

where "eta" ($\eta$) represents the efficiency obtained. That is, the passage from 2 to 3 is effected without a change in magnetic entropy as required by (4).

The variation in the magnetic field within the coil associated with the fact that the specific heat of the fluid in question, in the presence of a magnetic field, is less than in the absence of the field enable a higher yield to be obtained than was possible before this invention.

According to the main feature of the invention, the magnetic field in the first heat exchanger has a variable magnetic-field-strength profile along the axis of movement of the ferromagnetic fluid such that the magnetic entropy due to the alignment of the particles by means of the magnetic field remains substantially constant.

According to another feature of the invention, the profile of the magnetic field within the coil is varied by varying the density of the turns of the coil.

According to another feature of the invention, the profile of the magnetic field within the coil is varied by varying the diameter of the turns of the coil.

The circuits according to the invention will now be described more specifically again with reference to FIG. 1, in which A and B represent the first and second heat exchangers respectively, and C and F the cold sources, for example radiators, the cold source E is omitted, since the system used eliminates the heat passing through it. The heat sources D and G may be formed by two separate parts of a single heater, for example a nuclear reactor, while the utilizer T may be formed, for example, by a turbine or MHD (magnetohydrodynamic) generator or equivalent external apparatus.

The practical production of the coil solenoid does not present any technological difficulties, as the following example shows:

Axial length of solenoid 1 m. the solenoid is subdivided into transverse sections:

Diameter of transverse sections 0.1 m.
Number of transverse sections 50.

Each transverse section is formed by a number of turns of contant diameter to that of the section. Each section contains a different number of turns.

In this case, the density of the turns is varied along the solenoid while their diameter remains constant.

If, however, one wished to keep the density of the turns constant, their diameters would be varied according to the desired field profile. Furthermore it is possible to vary both the density and the diameter of the turns. It is also possible to vary the current strength in the sections.

The system according to this invention may be used in nuclear reactors operating at high temperatures (900°–1100° C.). In this case the coolant represents the heat source of the system, while the cold source is formed by steam or other vapour.

The fact that this system is smaller and lighter in weight and also has a distinctly higher yield than conventional converters makes its use interesting and highly competitive where weight restriction is of prime importance, for example in space.

The invention is not limited to the form described and illustrated in the accompanying drawings, but includes the many variants that may be used without going beyond the principle of the invention.

I claim:

1. A converter of heat into kinetic energy using a fluid or suspension having ferromagnetic characteristics, comprising: first heat exchanger means for transferring heat from a secondary fluid to said ferromagnetic fluid; means for subjecting said ferromagnetic fluid to a magnetic field; means for accelerating said ferromagnetic fluid in a closed circuit, said accelerating means including said magnetic field; said closed circuit containing a cold source upstream of said first heat exchanger and a heat source downstream of said first heat exchanger; pump means for circulating said secondary fluid in a direction generally opposite to that of said ferromagnetic fluid; second heat exchanger means for extracting thermal energy from said ferromagnetic fluid; external heat source means for heating said secondary fluid between said second and said first heat exchanger means; and cold source means for cooling said secondary fluid between said first and said second heat exchanger means; wherein the magnetic field in said first heat exchanger has a magnetic-field-strength profile which varies along the axis of movement of said ferromagnetic fluid in such manner that the magnetic entropy due to the alignment of the magnetic particles of said ferromagnetic fluid by means of said magnetic field remains substantially constant, wherein said magnetic-field-strength profile is produced in a coil associated with said first heat exchanger and the density of the turns along the axis of said coil is made variable according to the desired magnetic-field profile.

2. A converter of heat into kinetic energy using a fluid or suspension having ferromagnetic characteristics, comprising: first heat exchanger means for transferring heat from a secondary fluid to said ferromagnetic fluid; means for subjecting said ferromagnetic fluid to a magnetic field; means for accelerating said ferromagnetic fluid in a closed circuit, said accelerating means including said magnetic field; said closed circuit containing a cold source upstream of said first heat exchanger and a heat source downstream of said first heat exchanger; pump means for circulating said secondary fluid in a direction generally opposite to that of said ferromagnetic fluid; second heat exchanger means for extracting thermal energy from said ferromagnetic fluid; external heat source means for heating said secondary fluid between said second and said first heat exchanger means; and cold source means for cooling said secondary fluid between said first and said second heat exchanger means; wherein the magnetic field in said first heat exchanger has a magnetic-field-strength profile which varies along the axis of movement of said ferromagnetic fluid in such manner that the magnetic entropy due to the alignment of the magnetic particles of said ferromagnetic fluid by means of said magnetic field remains substantially constant, wherein said magnetic-field-strength profile is produced by a coil associated with said first heat exchanger and the diameter of the turns of said coil is made variable according to the desired magnetic-field profile.

3. A converter of heat into kinetic energy using a fluid or suspension having ferromagnetic characteristics, comprising: first heat exchanger means for transferring heat from a secondary fluid to said ferromagnetic fluid; means for subjecting said ferromagnetic fluid to a magnetic field; means for accelerating said ferromagnetic fluid in a closed circuit, said accelerating means including said magnetic field; said closed circuit containing a cold source upstream of said first heat exchanger and a heat source downstream of said first heat exchanger; pump means for circulating said secondary fluid in a direction generally opposite to that of said ferromagnetic fluid; second heat exchanger means for extracting thermal energy from said ferromagnetic fluid; external heat source means for heating said secondary fluid between said second and said first heat exchanger means; and cold source means for cooling said secondary fluid between said first and said second heat exchanger means; wherein the magnetic field in said first heat exchanger has a magnetic-field-strength profile which varies along the axis of movement of said ferromagnetic fluid in such manner that the magnetic entropy due to the alignment of the magnetic particles of said ferromagnetic fluid by means of said magnetic field remains substantially constant, wherein said magneticfield-strength profile is produced by a coil associated with said first heat exchanger and the variation of said magnetic-field-strength profile along the axis of said coil is obtained by varying the density of the turns of said coil and the diameter of said turns.

4. A converter of heat into kinetic energy using a fluid or suspension having ferromagnetic characteristics, comprising: first heat exchanger means for transferring heat from a secondary fluid to said ferromagnetic fluid; means for subjecting said ferromagnetic fluid to a magnetic field; means for accelerating said ferromagnetic fluid in a closed circuit, said accelerating means including said magnetic field; said closed circuit containing a cold source upstream of said first heat exchanger and a heat source downstream of said first heat exchanger; pump means for circulating said secondary fluid in a direction generally opposite to that of said ferromagnetic fluid; second heat exchanger means for extracting thermal energy from said ferromagnetic fluid; external heat source means for heating said secondary fluid between said second and said first heat exchanger means; and cold source means for cooling said secondary fluid between said first and said second heat exchanger means; wherein the magnetic field in said first heat exchanger has a magnetic-field-strength profile which varies along the axis of movement of said ferromagnetic fluid in such manner that the magnetic entropy due to the alignment of the magnetic particles of said ferromagnetic fluid by means of said magnetic field remains substantially constant, wherein said first heat exchanger comprises coils through which current flows to create said magnetic field, said current remaining constant with time.

References Cited

UNITED STATES PATENTS

| | | | |
|---|---|---|---|
| 2,651,258 | 9/1953 | Pierce | 103—1 X |
| 3,257,949 | 6/1966 | Mead | 103—1 X |
| 3,348,487 | 10/1967 | Miller | 103—1 X |
| 3,448,751 | 6/1969 | Rosaen | 103—1 X |

OTHER REFERENCES

AIAA Journal, vol. 2 pp. 1418–1420 (1964), Resler & Rosensweig.

MARTIN P. SCHWADRON, Primary Examiner

L. J. PAYNE, Assistant Examiner

U.S. Cl. X.R.

60—36; 417—50